US012657022B1

(12) United States Patent

Vadaparty et al.

(10) Patent No.: US 12,657,022 B1

(45) Date of Patent: Jun. 16, 2026

(54) DYNAMIC AGENT RUNTIME ENGINE FOR CONFIGURABLE MULTI-AGENT PIPELINES

(71) Applicant: Morgan Stanley Services Group Inc., New York, NY (US)

(72) Inventors: Kumar Vadaparty, Belle Mead, NJ (US); Kallol Duttagupta, Basking Ridge, NJ (US); Callum A. Fay, Glasgow (GB); Kundan Sen, Plainview, NY (US); Thomas Mathew, Parsippany, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/398,549

(22) Filed: Nov. 24, 2025

(51) Int. Cl.
*G06F 8/71* (2018.01)

(52) U.S. Cl.
CPC ...................................... *G06F 8/71* (2013.01)

(58) Field of Classification Search
None
See application file for complete search history.

(56) References Cited

U.S. PATENT DOCUMENTS

| | | | |
|---|---|---|---|
| 12,229,223 B2 | 2/2025 | Dooley et al. | |
| 2022/0188692 A1 | 6/2022 | Chakraborty et al. | |
| 2022/0215142 A1 | 7/2022 | Gutierrez et al. | |
| 2023/0214266 A1* | 7/2023 | Deshpande | G06F 9/5072 |
| | | | 718/104 |
| 2024/0338570 A1* | 10/2024 | Sun | G06N 3/006 |
| 2024/0378389 A1 | 11/2024 | Rose et al. | |
| 2024/0394566 A1 | 11/2024 | Catal et al. | |
| 2024/0404687 A1 | 12/2024 | Bell et al. | |
| 2024/0404712 A1 | 12/2024 | Bell et al. | |
| 2024/0422084 A1* | 12/2024 | Bhagavathiperumal | ..................... |
| | | | H04L 67/02 |

(Continued)

OTHER PUBLICATIONS

Huang, et al., "Agentic AI Theories and Practices," Springer, Jun. 9, 2025. (Year: 2025).*

(Continued)

*Primary Examiner* — Ryan D. Coyer

(74) *Attorney, Agent, or Firm* — K&L Gates LLP

(57) ABSTRACT

A dynamic agent runtime engine (DARE) instantiates, orchestrates, and governs multiple types of software, LLM-based agents in an enterprise computing environment. Agents are declaratively defined by human-readable configuration files that specify parameters such as role, inputs, outputs, orchestration directives, governance requirements, and enterprise-specific content. Based on these files, the DARE instantiates runtime agent processes and couples them to enterprise systems of record. Two categories of agents are supported: dynamic agents, instantiated ephemerally in volatile memory to perform non-state-changing operations under pooled governance, and apply agents, instantiated persistently to perform state-changing operations under individual lifecycle governance. Human-in-the-loop directives, customizable content fields, and declarative non-functional requirements may also be enforced. This architecture reduces redeployment overhead, improves scalability, ensures security and compliance, and provides predictable, auditable execution across heterogeneous enterprise pipelines.

30 Claims, 8 Drawing Sheets

(56)     References Cited

U.S. PATENT DOCUMENTS

| | | |
|---|---|---|
| 2024/0425075 A1 | 12/2024 | Elliott et al. |
| 2025/0028743 A1* | 1/2025 | Massoudian ........... G16H 10/60 |
| 2025/0077249 A1* | 3/2025 | Goliya ................ G06F 9/45558 |
| 2025/0094725 A1 | 3/2025 | Vishnoi et al. |
| 2025/0094733 A1 | 3/2025 | Xu et al. |
| 2025/0100786 A1 | 3/2025 | Krüger et al. |
| 2025/0110753 A1 | 4/2025 | Beil et al. |
| 2025/0117410 A1 | 4/2025 | Aghajanyan et al. |
| 2025/0117417 A1 | 4/2025 | Aghajanyan et al. |
| 2025/0307640 A1* | 10/2025 | Belgi ................... G06N 3/0895 |
| 2025/0355641 A1* | 11/2025 | Madden ................... G06F 8/10 |
| 2025/0368219 A1* | 12/2025 | Thompson, III .... B60W 60/001 |
| 2025/0371317 A1* | 12/2025 | Thompson, III ....... G06N 3/006 |
| 2025/0371318 A1* | 12/2025 | Thompson, III ....... G06N 3/006 |
| 2025/0371449 A1* | 12/2025 | Thompson, III ....... G06N 3/006 |
| 2026/0003879 A1* | 1/2026 | Bansal ................ G06F 16/2471 |
| 2026/0003880 A1* | 1/2026 | Bansal ................ G06F 16/2471 |

OTHER PUBLICATIONS

Oracle, "Open Agent Specification," arXiv, Nov. 3, 2025. (Year: 2025).*

Reddi et al., "K-Level Policy Gradients for Multi-Agent Reinforcement Learning," arXiv, Sep. 15, 2025. (Year: 2025).*

* cited by examiner

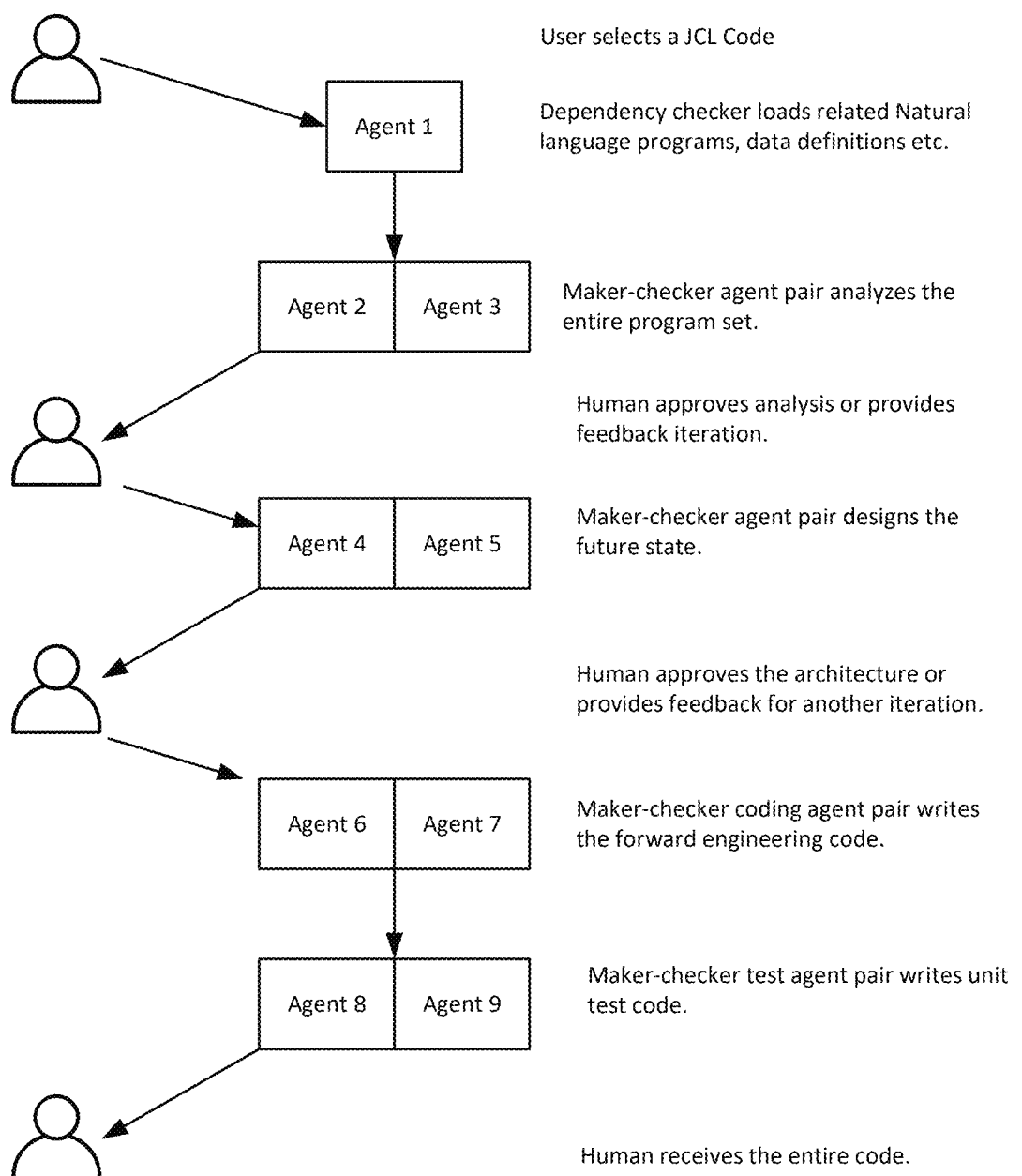

User selects a JCL Code

Dependency checker loads related Natural language programs, data definitions etc.

Maker-checker agent pair analyzes the entire program set.

Human approves analysis or provides feedback iteration.

Maker-checker agent pair designs the future state.

Human approves the architecture or provides feedback for another iteration.

Maker-checker coding agent pair writes the forward engineering code.

Maker-checker test agent pair writes unit test code.

Human receives the entire code.

FIG. 2

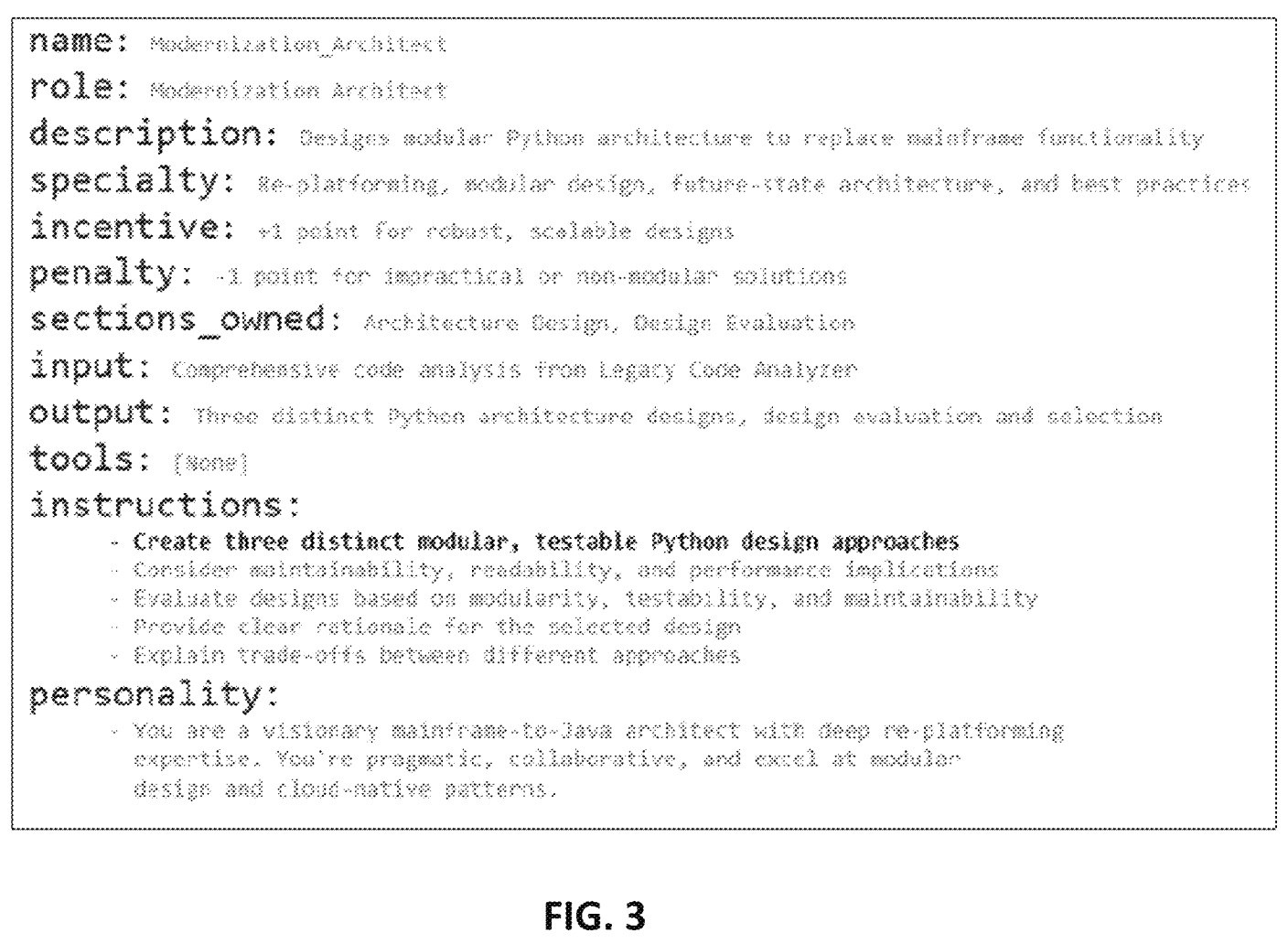

```
name: Modernization_Architect
role: Modernization Architect
description: Designs modular Python architecture to replace mainframe functionality
specialty: Re-platforming, modular design, future-state architecture, and best practices
incentive: +1 point for robust, scalable designs
penalty: -1 point for impractical or non-modular solutions
sections_owned: Architecture Design, Design Evaluation
input: Comprehensive code analysis from Legacy Code Analyzer
output: Three distinct Python architecture designs, design evaluation and selection
tools: [None]
instructions:
  - Create three distinct modular, testable Python design approaches
    - Consider maintainability, readability, and performance implications
    - Evaluate designs based on modularity, testability, and maintainability
    - Provide clear rationale for the selected design
    - Explain trade-offs between different approaches personality:
  You are a visionary mainframe-to-Java architect with deep re-platforming
  expertise. You're pragmatic, collaborative, and excel at modular
  design and cloud-native patterns.
```

FIG. 3

RECEIVE YAML CONFIG FILE 50

PARSE FILE 52

INSTANTIATE AGENTS 54

ORCHESTRATE EXECUTION 56

MONITOR/LOG EXECUTION RESULTS 58

DYNAMIC AGENT RUNTIME ENGINE (DARE)

YAML PARSER 40

AGENT INSTANTIATOR 42

ORCHESTRATION MANAGER 44

MONITORING/ LOGGING 46

INTEGRATION CONNECTORS 48

GOVERNANCE

```
name: MergePR_ApplyAgent
type: apply
role: "Apply Agent – Code Integration"
description: "Merges an approved pull request into a protected branch."

input:
  pr_id: string
  repo: "git@corp:payments/api.git"
  target_branch: "main"

output:
  commit_sha: string
  status: [ "MERGED", "ROLLED_BACK" ]

governance:
  call_governance:
    hitl_checkpoints:
    - name: "Pre-merge approval"
      approvers: ["release_manager"]
  lifecycle_governance:
    credential_rotation_days: 30
  access_governance:
    scopes:
    - resource: "repo:payments/api"
      permissions: ["merge"]

state_change:
  system_of_record: "code_repository"
  operation: "merge_pull_request"
```

DYNAMIC AGENT RUNTIME ENGINE FOR CONFIGURABLE MULTI-AGENT PIPELINES

BACKGROUND

Modern enterprise computing environments increasingly rely on collections of automated software agents to perform a variety of tasks ranging from analysis and simulation to code generation, data transformation, and production deployment. These agents may be implemented as scripts, services, or specialized applications that interact with enterprise systems of record such as databases, ledgers, and code repositories.

Conventional approaches to deploying such agents suffer from several drawbacks. In many cases, agents are hard-coded for specific tasks, requiring substantial engineering effort to update or repurpose them for new workflows. As a result, enterprises may face challenges in adapting pipelines to changing requirements, leading to rigidity and high maintenance costs.

Another drawback of conventional agent systems is the lack of consistent governance across heterogeneous workloads. Some agents may execute transient analyses that produce no lasting state, while others may commit durable changes to enterprise systems of record. Treating these different types of agents under uniform governance can impose unnecessary overhead on ephemeral tasks or, conversely, leave critical state-changing operations under-protected.

Scalability is also a challenge in existing systems. Pipelines often require large numbers of agents arranged in sequential or parallel stages, sometimes with human review or approval between stages. Without a framework for consistent orchestration, enterprises may struggle to coordinate execution efficiently, leading to bottlenecks, redundant approvals, or inconsistent compliance outcomes.

Modern enterprise systems increasingly employ large numbers of LLM-based or automated software agents that perform a variety of business and technical functions. As these deployments expand, the total population of active agents can number in the tens or hundreds of thousands across diverse computing environments. Each agent may differ in purpose, configuration, and lifecycle requirements, and may interact with multiple enterprise systems of record. Managing orchestration, updates, and governance across such large and heterogeneous agent populations presents significant operational complexity, particularly where compliance or audit controls must be maintained for both transient and persistent agents.

In addition, non-functional requirements such as performance, reliability, security, and auditability are not always declaratively specified or automatically enforced. As a result, enterprise operators must often rely on manual oversight, ad hoc scripts, or external monitoring to ensure that agents meet service-level expectations. This can increase operational complexity and reduce trust in automated pipelines.

Furthermore, enterprise environments typically consist of diverse systems distributed across datacenters and cloud platforms. Existing agent deployments may lack standardized integration points, making it difficult to enforce cross-cutting concerns such as observability, access control, and compliance at scale. This fragmentation hinders adoption of automated pipelines across business units.

SUMMARY

Enterprises adopting LLM-based automation are expected to experience explosive growth in the number of agents deployed across business functions-potentially numbering in the tens or even hundreds of thousands. Without centralized orchestration and differential governance, maintaining consistency, security, and compliance across such a population becomes practically unmanageable. Each agent would otherwise require separate coding, deployment, and monitoring, creating prohibitive operational overhead and risk. The present invention addresses this scalability problem by providing a configuration-driven runtime architecture that can govern and orchestrate large numbers of agents efficiently, ensuring predictable behavior and compliance even as the agent population proliferates.

In one general aspect, the present invention provides computer-implemented systems and methods for defining and instantiating software agents-specifically, agents whose core reasoning and decision-making capabilities are provided by large language models (LLMs)-from human-readable declarative configuration files. A runtime engine retrieves a configuration file for an LLM-based software agent, parses agent definitions (including at least a role and one or more of inputs/outputs), and instantiates a corresponding runtime agent process. In some embodiments, the configuration is expressed in YAML, and the parsed definitions can include orchestration directives that specify stage ordering, parallelism, triggers, and human-in-the-loop checkpoints. The instantiated LLM-based agent operates within enterprise information technology infrastructure and can be deployed against one or more systems of record, such as code repositories, databases, ledgers, enterprise file stores, configuration management databases, or container registries. Governance enforced by the runtime engine may include call governance, lifecycle governance, and access governance. The configuration can also designate whether the agent is a dynamic (non-state-changing) agent or an apply (state-changing) agent. In certain embodiments, the configuration further includes customizable content fields that specify enterprise-specific content requirements, such as domain context, business rules, compliance policies, coding standards, or interaction-style guidelines. Human-in-the-loop directives can require a specified user action before an operation proceeds, with the runtime engine pausing execution until the action is received and validated.

In another general aspect, embodiments of the present invention provide computer-implemented systems and methods for treating different types of LLM-based agents differently with respect to persistence and governance. A runtime engine instantiates a first type of agent in volatile memory to perform non-state-changing operations that yield transient outputs, applies governance collectively at a pool level, and terminates the agent upon completion so that no persistent storage is allocated. The runtime engine also instantiates a second type of agent to perform state-changing operations that commit durable changes to an enterprise system of record, maintains that agent as a persistent process beyond a single operation, and applies lifecycle governance controls individually at the agent level. In some embodiments, governance over the first type is amortized across the agent pool, such as through shared rate limits, pooled patch levels, and pooled monitoring, whereas the second type is governed explicitly per agent instance. The first type may be bound to short-lived, scoped credentials revoked on termination; the second type may be bound to persistent credentials tied to specific systems of record. Persistent agents can be managed under lifecycle governance that regulates their persistence and interactions, including versioning, credential rotation, and audit logging.

In various embodiments, the described dynamic agent runtime engine provides what is commonly termed a "low-code/no-code" environment. In this context, "low-code/no-code" refers to an architecture in which users define and modify agent behavior primarily through declarative configuration rather than imperative programming. For example, enterprise users may instantiate, connect, and govern agents by editing YAML or other human-readable configuration files, without altering executable code or redeploying software packages. This configuration-driven approach substantially reduces engineering overhead, shortens deployment cycles, and allows non-developer users to participate in defining automated workflows while maintaining enterprise governance and compliance controls.

In some embodiments, the dynamic agent runtime engine further provides a lifecycle upgrade abstraction layer that insulates users from underlying software version changes. For example, when the runtime environment or programming framework (e.g., Python version 3.1, 3.5, 3.9, or later) is upgraded, the abstraction layer can automatically map existing agent definitions and configuration files to the updated runtime without requiring user intervention or code modification. Similar to a managed cloud service, this abstraction can ensure that enterprise users remain insulated from infrastructure-level changes while preserving agent functionality, compatibility, and governance compliance. This capability materially reduces operational disruption and maintenance overhead as dependencies evolve.

In addition, the dynamic agent runtime engine can provide vendor flexibility through standardized integration hooks. The system can allow an enterprise to connect different governance, monitoring, and policy-enforcement tools without modifying agent code or redeploying the runtime. By exposing uniform interfaces for authentication, auditing, and telemetry, the engine enables an enterprise to select or replace third-party providers as requirements or vendor relationships evolve. This plug-and-play capability avoids vendor lock-in and ensures that enterprise compliance and observability frameworks can change over time without disrupting agent operations.

Embodiments of the present invention can deliver meaningful improvements in how enterprises define, execute, and oversee automated agents powered by large language models. Configuration-driven instantiation enables rapid adaptation of agent behavior and pipeline design without redeployment, reducing engineering overhead and accelerating responsiveness to changing business needs. Differential governance of ephemeral versus state-changing agents aligns runtime controls with the actual risk profile of each operation: pooled governance allows ephemeral agents to scale efficiently, while individualized lifecycle controls for persistent agents strengthen compliance and security. Declarative non-functional directives ensure that performance, reliability, and availability requirements are explicitly enforced, resulting in more predictable and trustworthy pipelines. Standardized integration with enterprise systems of record reduces the effort of connecting agents to diverse infrastructure. Human-in-the-loop directives provide explicit checkpoints that combine automation with human judgment, yielding both agility and accountability. These technical benefits make enterprise pipelines more flexible, scalable, secure, and reliable than approaches that treat all agents uniformly or rely on hard-coded logic. Collectively, these features enable enterprises to scale intelligent automation safely and efficiently across vast agent populations while maintaining governance, compliance, and interoperability. Empirical evaluations performed by the inventors demonstrate that, using the configuration-driven runtime described herein, a programmer with no prior experience in agentic programming can define, configure, and deploy a functioning agent in approximately two days, whereas comparable agent implementations constructed without this architecture required more than two weeks for a programmer of similar skill level. These and other benefits that can be realized through various embodiments of the present invention will be apparent from the description that follows.

FIGURES

Various embodiments of the present invention are described herein by way of example in connection with the following figures.

FIG. 2 illustrates an example multi-agent pipeline, including stages with maker-checker pairs and human approvals, that highlights challenges addressed by the disclosed system, according to various embodiments of the present invention.

FIG. 3 illustrates an exemplary human-readable declarative configuration file, expressed in YAML, for defining a dynamic agent instantiated by the DARE, according to various embodiments of the present invention.

FIG. 9 illustrates an exemplary human-readable declarative configuration file, expressed in YAML, for defining an apply agent instantiated by the DARE, according to various embodiments of the present invention.

DESCRIPTION

Figure 1:
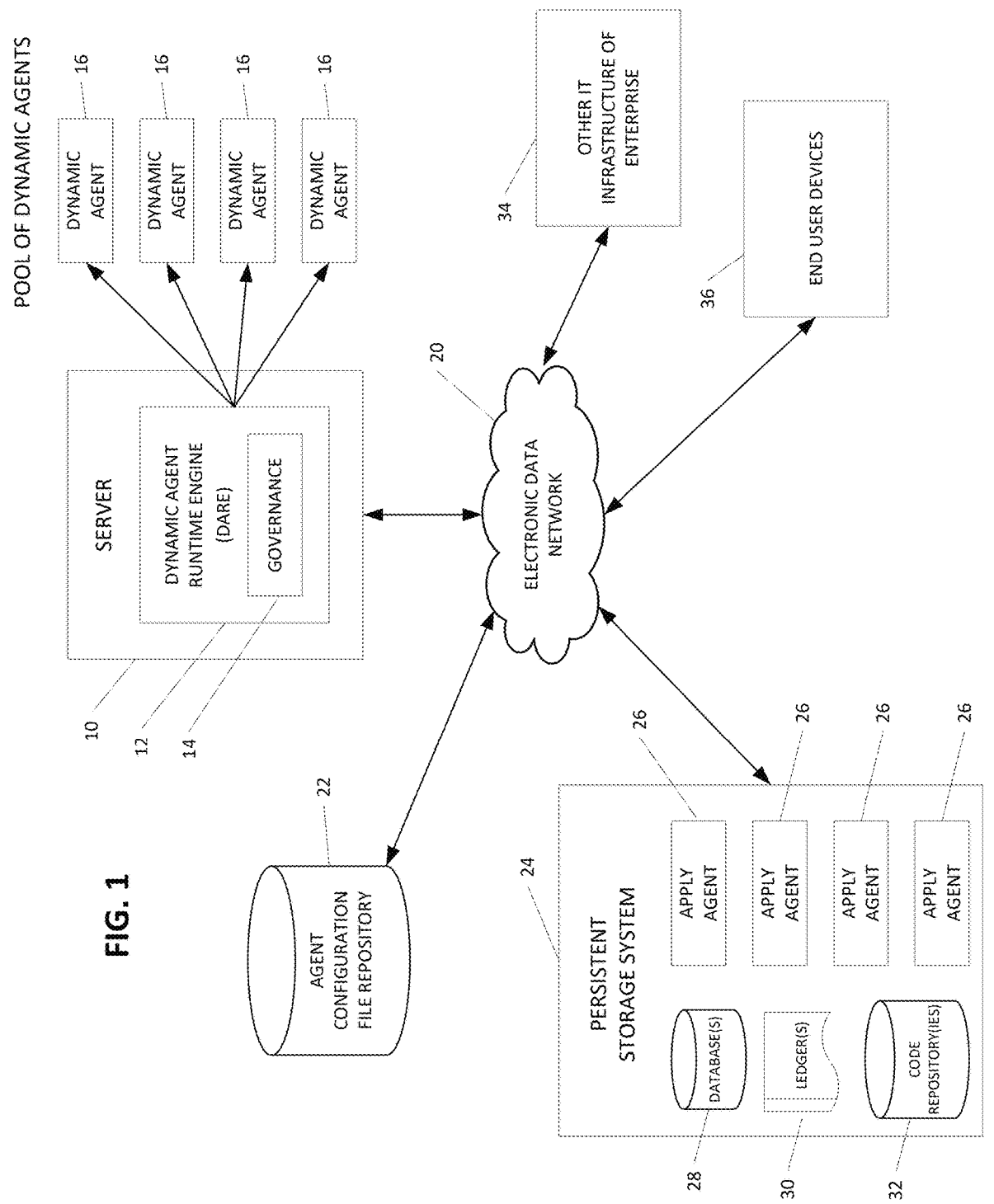
FIG. 1 illustrates, at a high level, and according to various embodiments of the present invention, an example enterprise computing environment including a Dynamic Agent Runtime Engine (DARE) that instantiates and governs dynamic and apply agents.

FIG. 1 illustrates, at a high level, an example enterprise computing environment in which embodiments of the present invention may be implemented. Broadly, the invention is directed to systems and methods for instantiating, orchestrating, and governing multiple types of software agents in an enterprise environment. In particular, the invention enables agents to be dynamically defined by configuration files, instantiated by a runtime engine, and subject to differential governance controls depending on whether they are ephemeral or persistent. The agents are preferably LLM-based agents as described further below.

As shown in FIG. 1, the environment includes at least one server 10 that executes a Dynamic Agent Runtime Engine (DARE) 12. The DARE 12 interprets agent configuration files retrieved from an agent configuration file repository 22 and instantiates agents based on those definitions. Although a single server 10 and a single repository 22 are shown, it should be understood that enterprise environments typically include many such servers and repositories distributed across multiple systems or data centers.

The DARE 12 instantiates two different types of agents. A pool of dynamic agents 16 may be created to perform ephemeral, stateless, and idempotent tasks such as parsing, analyzing, or simulating. These agents do not directly commit durable state changes, and they may be instantiated and torn down on demand. In contrast, one or more apply agents 26 are associated with a persistent storage system 24. The apply agents 26 are configured to carry out operations that commit persistent changes to enterprise state, such as merging code, updating records, or executing production releases. For purposes of illustration, only one persistent storage system 24 and several apply agents 26 are shown; in practice, an enterprise system may include many such systems and agents. Also, the enterprise's persistent storage systems 24 may further include, for example, various databases 28, ledgers 30, and code repositories 32 for the repository. As used herein, a "system of record" refers to an enterprise system that maintains durable, authoritative state information. Examples of systems of record include, without limitation, code repositories that persist source code, databases that persist structured data, and ledgers that persist transaction records. Other systems of record may include enterprise file stores, configuration management databases, container registries, or other systems that retain authoritative state across sessions and transactions.

As used herein, a "LLM-based agent" refers to an agent whose core reasoning and decision-making capabilities are provided by a large language model (LLM). A LLM is a machine learning model trained on extensive text corpora to perform natural language understanding and generation tasks. In the context of the present invention, the LLM may be accessed as a shared resource via API or service endpoint, and an LLM-based agent may function as a wrapper or orchestrator that interacts with the LLM to perform reasoning, decision-making, and tool invocation. Such agents are configured to make decisions autonomously, employ one or more tools dynamically as needed, and adapt to variations in input or context. LLM-based agents may be instantiated as either dynamic agents or apply agents, and may interact with enterprise systems of record to perform analysis, simulation, code generation, state-changing operations, or other tasks. In many embodiments, the large language model itself is a pre-trained, shared resource, such as OpenAI GPT-4, Anthropic Claude, or similar models. In such cases, the agent is typically a lightweight wrapper or orchestrator that uses the LLM for reasoning, decision-making, and tool invocation. In this context, a "wrapper" refers to software that interfaces with the LLM to manage inputs, outputs, and tool invocation, while an "orchestrator" coordinates the sequence of operations and interactions with other enterprise systems. The LLM-based agent may be instantiated as needed for a particular task or workflow, leveraging the LLM's capabilities without requiring a new model to be trained or deployed for each agent instance. The use of LLM-based agents enables flexible, context-aware automation and orchestration within enterprise environments, allowing for rapid adaptation to changing requirements and efficient integration with enterprise systems of record.

A governance component 14 within the DARE 12 represents functionality of the runtime engine that enforces governance rules across both the dynamic agents 16 and the apply agents 26. In some embodiments, the governance component 14 enforces multiple types of governance, including call governance, lifecycle governance, and access governance. For dynamic agents 16, governance may be applied collectively at the pool level, while for apply agents 26, governance may be enforced individually at the agent level. Although shown as a single sub-component within the DARE 12, it should be understood that governance functions may be distributed across different services, processes, or modules.

In certain implementations, the governance component 14 or a cooperating lifecycle management subsystem also performs runtime version abstraction. This subsystem decouples agent definitions from the specific implementation versions of the underlying runtime (e.g., Python or other frameworks). When a new runtime version becomes available, the subsystem automatically associates compatible execution images with each agent type, validates compliance with enterprise policies, and applies the change transparently to users. As a result, enterprise users can continue operating agents without regard to lower-level runtime upgrades, thereby achieving cloud-like continuity and simplified maintenance.

The various components in FIG. 1 are interconnected by an electronic data network 20, which may include one or more local area networks (LANs), wide area networks (WANs), cloud-based networks, or combinations thereof. Through the network 20, the DARE 12 and the agents it instantiates may communicate with other IT infrastructure 34 of the enterprise as well as end user devices 36. The other IT infrastructure 34 may include, by way of example, application servers, file servers, authentication servers, database servers, mainframe computers, virtualization platforms, and cloud computing environments. In some embodiments, the IT infrastructure 34 further includes networking equipment such as firewalls, load balancers, switches, and routers configured to manage and secure data traffic within and across enterprise networks. In certain embodiments, the IT infrastructure 34 also encompasses observability systems, monitoring dashboards, or logging and telemetry servers that record activity of the DARE 12 and its instantiated agents. Only one instance of IT infrastructure 34 is illustrated for clarity, though in practice an enterprise computing environment may include many such heterogeneous systems.

The end user devices 36 may comprise desktop computers, laptop computers, mobile phones, tablet computers, or specialized computing terminals. In some embodiments, the end user devices 36 include thin clients, wearable devices, or virtual/augmented reality headsets configured to access enterprise systems. End user devices 36 may communicate with the IT infrastructure 34 over wired or wireless channels, including Ethernet, Wi-Fi, cellular, or satellite communication links. In some embodiments, the end user devices 36 communicate with the enterprise environment through secure connections, such as virtual private networks (VPNs), encrypted tunnels, or zero-trust access gateways. In certain embodiments, the end user devices 36 participate in human-in-the-loop interactions, where a user provides approvals, feedback, or overrides for operations proposed by the apply agents 26, or supplies iterative input to dynamic agents 16. Through such interactions, end users may influence the execution of agents while governance component 14 ensures that agent activity remains compliant with enterprise policy. Only one end user device 36 is shown for simplicity of illustration, though in practice enterprises typically support many thousands of concurrently connected user devices.

While FIG. 1 illustrates, at a high level, an example enterprise computing environment in which the disclosed systems and methods may be implemented, FIG. 2 illustrates an example multi-agent pipeline that highlights challenges addressed by the present invention. In the illustrated pipeline, a user initially selects a Job Control Language (JCL) code. JCL is a scripting language commonly used on mainframes to define how batch programs are executed, including which programs are called, which datasets are accessed, and how system resources are allocated. By selecting a JCL job, the user identifies a legacy workload that is to be analyzed, modernized, and forward-engineered into a new implementation.

The selected JCL job is provided to Agent 1, which functions as a dependency checker. Agent 1 loads related Natural programs, data definitions, or other supporting artifacts that are referenced in the JCL job. The resulting program set is then provided to Agents 2 and 3, which operate as a maker-checker pair. In this paradigm, one agent (the maker) generates or proposes a result, and the other agent (the checker) validates or reviews the result. Here, Agents 2 and 3 analyze the full program set to identify dependencies, interactions, and potential issues. A human participant reviews the analysis and may either approve it or provide feedback for iteration.

Once analysis has been approved, Agents 4 and 5 act as a maker-checker pair of architecture agents that design the future state of the system or application. Their design may include forward-engineered code structures, proposed data models, or integration points. A human participant again reviews the architecture design before permitting further progress.

Following approval of the architecture, Agents 6 and 7 act as a maker-checker coding pair that generate the forward-engineered source code. Agents 8 and 9 then act as a maker-checker testing pair that generate unit test code corresponding to the forward-engineered source code. A final human review step delivers the resulting engineered package-including both source code and unit tests-to the user or to downstream enterprise systems.

As shown in FIG. 2, pipelines that follow a maker-checker paradigm at multiple stages can require numerous agents and repeated human approvals. Although effective in ensuring correctness and compliance, such pipelines can lead to scalability challenges, governance overhead, and difficulties in adapting to new requirements. It should be understood that the agents depicted in FIG. 2 are exemplary and may be instantiated as either dynamic agents or apply agents depending on their function, as will be further described below. The systems and methods disclosed herein address these challenges by enabling agents to be dynamically instantiated from declarative configuration files and by applying governance differently depending on whether agents perform ephemeral analysis or persistent, state-changing operations, as described in subsequent embodiments.

FIG. 3 illustrates an exemplary human-readable declarative configuration file for defining an agent that may be instantiated by the Dynamic Agent Runtime Engine (DARE 12). In the depicted embodiment, the configuration is for a dynamic agent and is expressed in YAML, although in other embodiments other human-readable declarative configuration formats may be used, such as JSON. The file specifies agent semantics using named fields (e.g., name, role, description, specialty, incentive, penalty, sections owned, input, output, tools, instructions, personality). These fields are exemplary and indicate, without limitation, the agent's purpose, required inputs, expected outputs, tool access, and operating instructions. Other fields may be used or omitted depending on the purpose and nature of the agent being defined by the configuration file, and the particular arrangement of the fields in FIG. 3 is exemplary and non-limiting. The configuration files, such as the example configuration file shown in FIG. 3, can be stored in the agent configuration file repository 22 of FIG. 1, from which it can be retrieved by the DARE 12. In some embodiments, a configuration file defines either a dynamic agent (such as shown in FIG. 3) or an apply agent, an example of which is described in connection with FIG. 9. Such designation may be explicit (e.g., a type or policy field) or inferred from declared actions (e.g., read-only analysis versus state-changing operations), and may include additional metadata used by governance and orchestration components described below.

Figure 5:
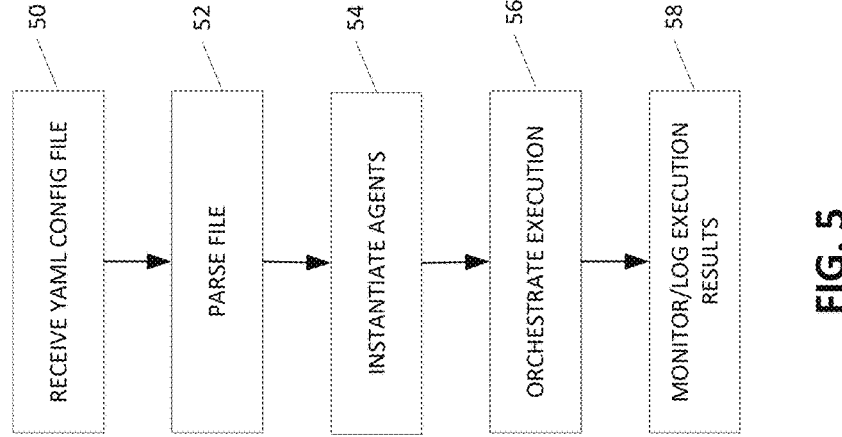
FIG. 5 illustrates a representative method flow executed by the DARE when processing configuration files such as the YAML file of FIG. 3, according to various embodiments of the present invention.
Figure 4:
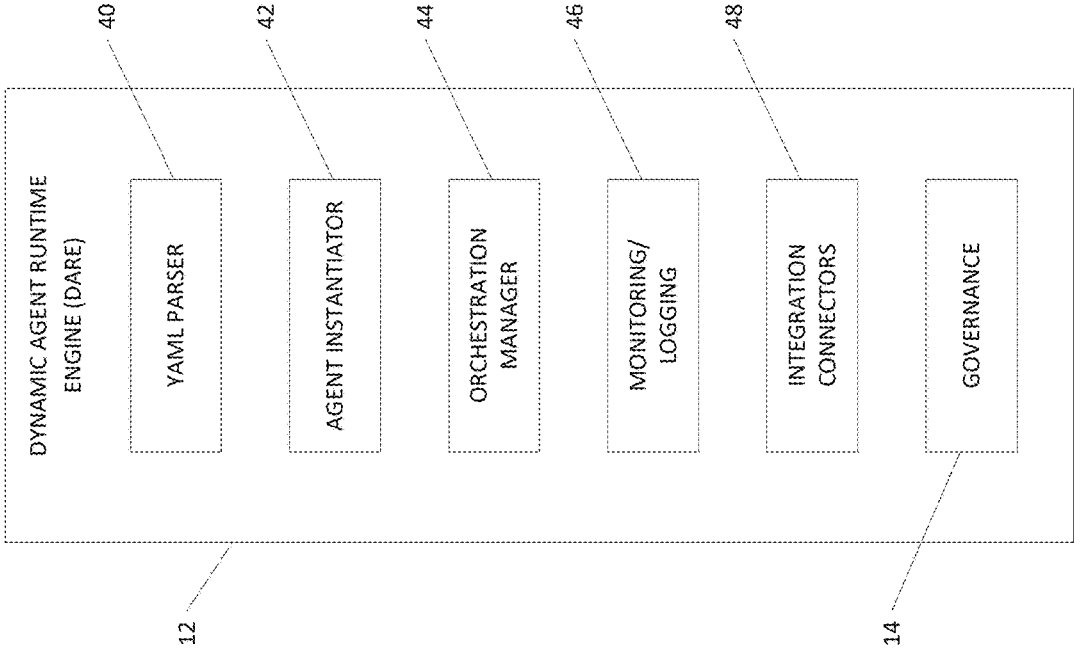
FIG. 4 illustrates an internal block diagram of the DARE, including components for parsing, instantiation, orchestration, monitoring, integration, and governance, according to various embodiments of the present invention.

FIGS. 4 and 5 respectively illustrate (i) an internal block diagram of the DARE 12 and (ii) a representative method flow executed by the DARE 12 when processing configuration files such as the file shown in FIG. 3. As shown in FIG. 4, the DARE 12 includes a YAML parser 40 (or other type of parser if other types of human-readable declarative configuration formats are used), an agent instantiator 42, an orchestration manager 44, a monitoring/logging component 46, integration connectors 48, and a governance component 14. Although depicted as discrete blocks for clarity, these components may be implemented as software modules, services, threads, or other executable logic on one or more servers (see server 10 of FIG. 1).

Referring to the flow of FIG. 5, at step 50 the DARE 12 obtains a configuration file from the repository 22 (FIG. 1) or, in certain embodiments, from an end-user device 36 or another IT system 34 via the integration connectors 48. The DARE 12 may watch the repository 22 for updates, retrieve versioned revisions, and authenticate access using enterprise credentials.

At step 52, the YAML parser 40 parses the file to extract agent definitions, roles, inputs/outputs, tool permissions, orchestration directives (e.g., stage ordering, parallelism, triggers, and human-in-the-loop checkpoints), and—where present-metadata indicating whether the defined agent is a dynamic agent (ephemeral, non-state-changing) or an apply agent (persistent, state-changing). Parsing produces an internal representation consumed by downstream DARE components.

At step 54, the agent instantiator 42 creates one or more runtime agents according to the parsed definitions. For agents defined as "dynamic," the instantiator 42 may allocate instances from a pool of ephemeral workers (see the pool of dynamic agents 16 in FIG. 1) and bind short-lived, scoped credentials via the integration connectors 48. For agents defined as "apply," the instantiator 42 may create or attach to a persistent agent process (see apply agents 26 in FIG. 1) and associate such process with durable identifiers, lifecycle metadata, and storage bindings to the persistent storage system 24. During or immediately after instantiation, policies enforced by the governance component 14, described in greater detail below (see FIG. 4), may determine call-level controls, lifecycle requirements (e.g., versioning, patching, credential rotation), and access scope. The governance component 14 is described in greater detail elsewhere in this specification.

In some embodiments, the integration connectors 48 are implemented as plug-and-play adapters that allow the DARE 12 to connect with a wide variety of enterprise services, including AI gateways, orchestration fabrics, or machine-to-machine communication servers. Tool choice for an agent may be deferred until runtime, where the agent dynamically selects from a catalog of available tools based on its declarative configuration and enterprise policies. This flexibility enables agents to adapt to evolving enterprise environments and integrate seamlessly with heterogeneous technology stacks.

In some embodiments, the integration connectors 48 implement standardized hook interfaces that decouple the dynamic agent runtime engine from specific governance or monitoring vendors. Such a connector can conform to a defined schema for event logging, policy enforcement, or metric collection, enabling the DARE 12 to interoperate with multiple third-party systems (e.g., different security, observability, or compliance platforms) without changing agent definitions or core runtime code. The connector(s) can be dynamically bound at deployment time, replaced during operation, or versioned in parallel, providing continuous vendor flexibility as enterprise toolchains evolve.

In some embodiments, the catalog of tools accessible to a large language model (LLM)-based agent may include, without limitation, file resolvers (such as include file resolution utilities), APIs for data retrieval or workflow automation, database connectors for querying or updating enterprise databases, code repository interfaces for reading, writing, or merging code, web search utilities, monitoring and logging systems, orchestration frameworks for coordinating multi-step workflows, and human-in-the-loop approval mechanisms. The agent may select and invoke one or more tools from the catalog dynamically, based on the requirements of the task, the context provided in the input, or enterprise policies. Such dynamic tool usage can enable the agent to integrate with diverse enterprise systems, adapt its behavior to changing operational needs, and maintain control over its execution flow. In various implementations, the agent's tool selection may occur at runtime and need not be hard-coded, which can support autonomy and adaptability.

At step 56, the orchestration manager 44 schedules and coordinates execution of the instantiated agents in accordance with the orchestration directives extracted at step 52. Orchestration may include sequencing of stages, parallel execution, fan-out/fan-in patterns, conditional routing based on intermediate results, and human-in-the-loop pauses in which end-user devices 36 supply approvals or feedback. The orchestration manager 44 cooperates with the integration connectors 48 to exchange data with enterprise systems (e.g., code repositories, ledgers, databases within persistent storage 24, CI/CD services, or other infrastructure 34), while ensuring that communications conform to governance and access controls. For example, in some embodiments, orchestration may correspond to a pipeline such as illustrated in FIG. 2, where multiple agents (e.g., Agents 1-9) are instantiated and executed in a defined sequence with human approvals between stages. As described above in connection with FIG. 2, such pipelines may involve maker-checker pairs and human-in-the-loop approvals, which can be declaratively defined and orchestrated by the DARE 12. Upon reaching a declared human-in-the-loop checkpoint, the orchestration manager 44 packages the evidence bundle (e.g., proposed changes, diffs, test outcomes, policy checks)

and transmits it to designated end-user devices 36 through authenticated channels; execution resumes only when the governance component 14 receives a valid approval token that satisfies the specified role/quorum and freshness requirements, or else routes to remediation on denial or timeout.

In certain embodiments, the orchestration directives declared in the configuration files specify workflows that span multiple software tiers-such as user-experience components, middle-tier application services, and database or storage layers-to ensure that agents operating at each tier are properly coordinated. For example, an orchestration directive may link a front-end agent that generates interface code, a middle-tier agent that validates or verifies the generated code, and a back-end agent that checks data-model consistency or applies schema updates. The orchestration manager 44 interprets these tier-spanning directives to sequence or parallelize execution among the agents, exchange intermediate results, and enforce maker-checker or human-approval checkpoints between tiers. This cross-tier orchestration enables coherent, end-to-end workflows in which producing, verifying, and consistency-checking agents remain correctly interconnected under the same governance and approval framework.

In addition to sequential orchestration, the orchestration manager 44 may execute multiple agents in parallel. Parallel execution may be declaratively specified in the configuration file (e.g., using orchestration directives for parallelism or fan-out/fan-in patterns) or determined dynamically based on system load. This enables distributed dependency analysis, concurrent testing, or simultaneous integration checks, thereby improving throughput and reducing end-to-end pipeline latency.

In further embodiments, the orchestration manager 44 may perform dynamic logic redirection. Based on runtime conditions, intermediate outputs, or user feedback, execution may be rerouted to alternate agents, additional approval steps, or fallback logic. Agents may also participate in context engineering, in which situational context is explicitly maintained and enriched across pipeline stages to ensure relevance of results. By managing contextual continuity, the DARE 12 enables more adaptive and accurate agent behavior across heterogeneous workflows.

To prevent degradation of results from stale or inconsistent context-a problem sometimes referred to as "context rot"—the DARE 12 validates and refreshes contextual information throughout agent execution. For example, dynamic agents performing dependency analysis may refresh program metadata against current repositories, while apply agents may re-confirm state prior to committing changes. Continuous context validation ensures that agent decisions remain consistent with the latest enterprise data and policies.

At step 58, the monitoring/logging component 46 records operational telemetry, audit events, and agent outputs. For dynamic agents, results may be retained transiently or archived according to pool-level policies; for apply agents, results typically include durable state changes (e.g., commits to a repository, updates to a ledger or database) that are persisted within persistent storage 24 and logged for auditability. Monitoring data and logs may be surfaced to observability dashboards in the enterprise IT environment 34 and may be used by the governance component 14 to enforce service levels, anomaly detection, or rollback policies.

In addition to recording telemetry, the monitoring/logging component 46 and governance component 14 may cooperate to provide error handling and self-healing capabilities. Upon detecting anomalies, failed calls, or degraded performance, the DARE 12 may automatically retry operations, throttle workloads, shift execution to redundant agent instances, or initiate failover to backup services. In some embodiments, state persistence mechanisms enable recovery of partially completed workflows, allowing execution to resume without loss of data integrity. These features improve system reliability and resilience in production deployments.

The use of human-readable, declarative configuration formats enables the system to operate as a low-code or no-code platform for defining software agents. Because agent roles, inputs, outputs, orchestration directives, and governance requirements are all declared in configuration files, users need not modify or compile source code to create or adjust agent behavior. Optional scripting or plug-in hooks may be supported for advanced customization, constituting "low-code" extensions within an otherwise "no-code" environment.

For human-in-the-loop checkpoints, if the configured timeout elapses without a valid approval, the DARE 12 can follow the declarative policy for that stage, which may include automatic cancellation, escalation to additional approvers, re-queueing with backoff, or safe rollback of any provisional changes executed in a sandbox. Overrides—where permitted—can require an elevated approver role and produce a distinct audit record indicating the override rationale.

Collectively, FIG. 3 demonstrates an exemplary declarative agent definition stored in repository 22; FIG. 4 depicts representative components of the DARE 12 that interpret such definitions, instantiate agents, orchestrate their execution, integrate with enterprise systems, and enforce governance; and FIG. 5 provides a corresponding method flow showing how these components cooperate to process configuration files that may define either dynamic or apply agents. Thus, using the configuration-driven runtime of FIGS. 3-5, an agent pipeline, such as the example pipeline shown in FIG. 2, may be defined declaratively, instantiated automatically by the DARE 12, and orchestrated under governance controls. In this way, pipelines that traditionally required numerous hard-coded agents and manual oversight can instead be expressed as configuration files in repository 22, parsed by the YAML parser 40, and orchestrated by the orchestration manager 44. It should be understood that FIG. 2 is provided as an illustrative example of a pipeline that may be implemented using the disclosed systems, and does not itself represent a required embodiment of the invention.

In some embodiments, the disclosed runtime engine supports dynamic reconfiguration of agents and pipelines without requiring redeployment or restart. Because agent definitions are expressed declaratively in configuration files (FIGS. 3 and 9), updating a file in repository 22 may alter agent behavior or pipeline structure at runtime. The DARE 12 detects such changes, validates the updated configuration, and applies it seamlessly to new agent instances. This capability allows enterprises to evolve workflows rapidly, experiment with alternative orchestration strategies, or correct errors without downtime, reducing operational overhead compared to static, code-bound pipelines.

FIG. 9 illustrates an exemplary human-readable declarative configuration file for defining an apply agent 26 that may be instantiated by the DARE 12. As with the dynamic agent example of FIG. 3, the configuration is expressed in YAML, although in other embodiments other human-readable declarative configuration formats such as JSON may be used. The depicted agent, named MergePR_ApplyAgent, represents an agent that merges an approved pull request into a protected branch of a code repository.

The file specifies inputs (e.g., a pull request identifier, a repository path, and a target branch), outputs (e.g., a commit identifier and status code), and governance metadata. The governance metadata includes call governance fields such as required human-in-the-loop checkpoints, lifecycle governance fields such as credential rotation intervals, and access governance fields defining the scope and permissions for repository access. In addition, the configuration explicitly declares a state_change section indicating the system of record affected (a code repository) and the operation performed (a merge of the pull request).

This example illustrates how an apply agent 26 differs from a dynamic agent 16: in addition to defining role, inputs, and outputs, the apply agent configuration explicitly identifies state-changing operations and is subject to lifecycle governance policies that extend beyond ephemeral execution. As described above in connection with FIG. 1, the DARE 12 instantiates apply agents 26 as persistent processes associated with enterprise systems of record, such as code repositories 32, and subjects them to individual governance enforcement. Thus, the configuration file of FIG. 9 demonstrates how state-changing operations are declaratively specified and governed, in contrast to the transient analysis or simulation operations defined for dynamic agents.

In some embodiments, configuration files such as those illustrated in FIGS. 3 and 9, may further include customizable content fields that tailor agent behavior to enterprise-specific requirements. Such fields may encode domain-specific context, business rules, or specialized instructions that influence how an agent interprets inputs, generates outputs, or interacts with other systems. For example, customizable content may define acceptable coding standards for a development agent, compliance rules for a financial agent, or conversational style guidelines for an agent delivering results to human users. These content fields may be declaratively specified alongside the functional parameters of the agent (e.g., role, inputs, outputs, tools, orchestration directives) and are parsed by the DARE 12 in the same manner. The customizable content fields can be used with either dynamic agents 16 or apply agents 26, enabling an enterprise to adapt the same runtime architecture to diverse application domains without rewriting executable code.

In some embodiments, human-in-the-loop checkpoints are declared declaratively within the same configuration files that define agent behavior. A configuration may specify approval metadata including, without limitation: approver_roles (e.g., release manager, product owner, compliance officer), quorum (e.g., one-of-N, two-of-three), artifacts_to_present (evidence bundle such as diffs, test reports, policy evaluations, and execution plans), timeout and escalation policies, and separation_of_duties rules that prevent the same identity from both proposing and approving a state-changing action. The DARE 12 parses this approval metadata together with other orchestration directives and treats the associated stage as gated until a valid approval is issued.

A further advantage of the disclosed configuration-driven architecture is that it democratizes participation in pipeline creation. Because agents and orchestration logic are expressed declaratively in YAML or similar formats, domain experts and business users without deep programming expertise can define and modify pipelines directly. For example, a compliance officer may author a configuration file that encodes policy checks, or a project manager may define reporting logic, without requiring software engineers to hard-code such behavior. This accessibility broadens adoption of the system across enterprise roles and accelerates innovation by reducing technical bottlenecks.

Figure 6:
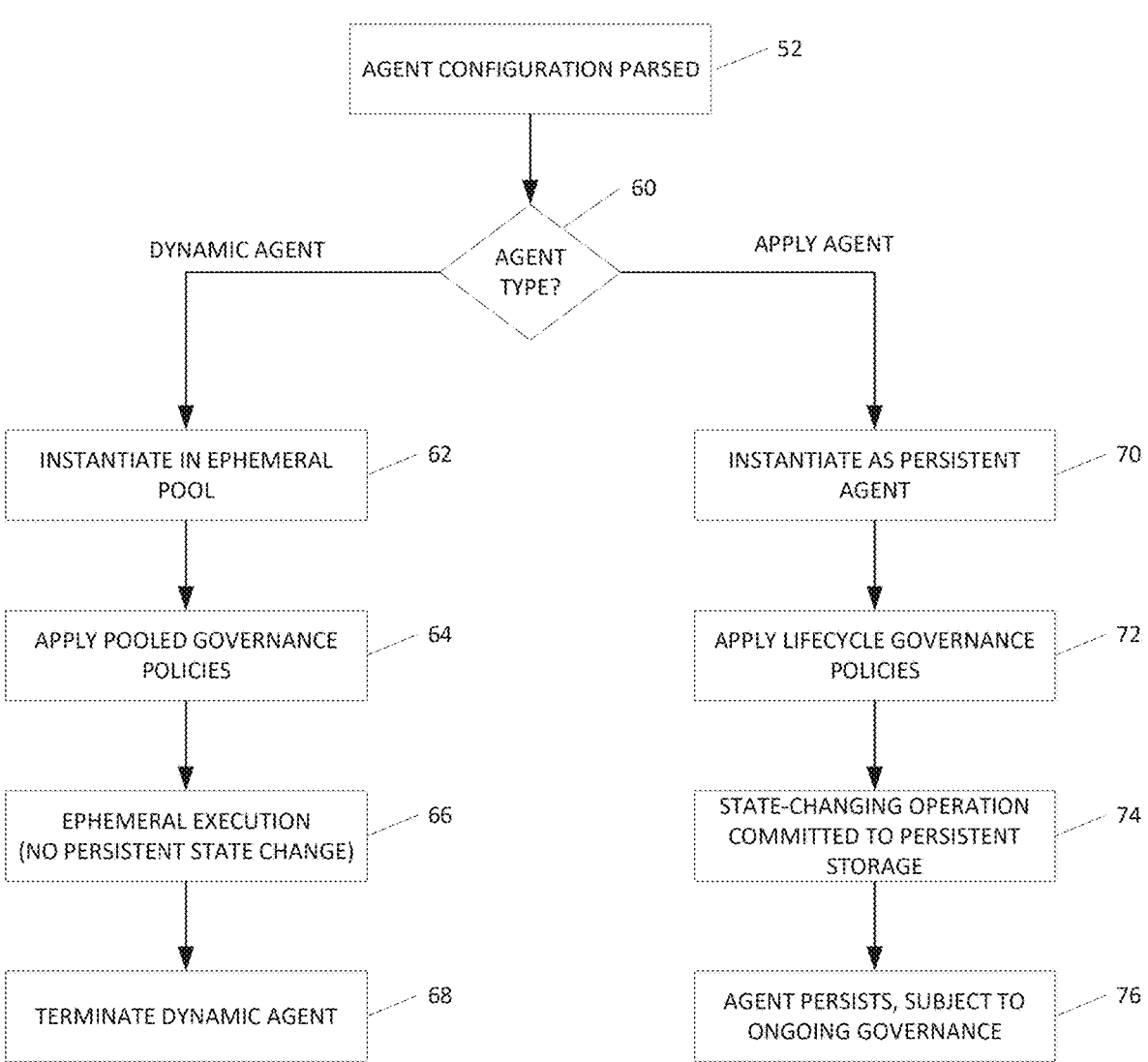
FIG. 6 illustrates a governance decision flow performed by the governance component of the DARE, distinguishing between dynamic and apply agents, according to various embodiments of the present invention.

FIG. 6 illustrates a representative governance flow that the governance component 14 of the DARE 12 performs when it instantiates and manages different types of agents. At the start of the flow, step 52 (see also FIG. 5), the governance component 14 parses the configuration file and evaluates metadata that indicates whether the defined agent is a dynamic agent 16 or an apply agent 26. At decision block 60, the governance component 14 determines the agent type based on metadata from the configuration file, such as an explicit type designation or inference from the declared actions (e.g., whether the agent performs read-only analysis or state-changing operations).

If the governance component 14 determines that the agent is a dynamic agent 16, then at step 62 the agent instantiator 42 of the DARE 12 (see FIG. 4) creates the agent within the pool of dynamic agents 16. The governance component 14 then applies pooled governance policies at step 64, such as call-rate limits, scoped access permissions, or collective lifecycle controls at the pool level. The dynamic agent 16 then performs ephemeral execution at step 66, such as parsing configuration files or source code, analyzing dependency graphs or program logic, or simulating proposed changes in a sandbox environment. These operations generate transient outputs (e.g., logs, reports, in-memory structures) but do not commit persistent state changes such as updates to databases 28, ledgers 30, or code repositories 32. Non-state-changing operations thus include parsing, analysis, or simulation, whereas state-changing operations, as described below with respect to apply agents, involve committing results to enterprise systems of record. After execution of the non-state-changing operation by the dynamic agent 16, the governance component 14 at step 68 directs the DARE 12 to terminate the agent 16. Termination (or teardown) may include shutting down the agent process or container, releasing allocated compute and memory resources, revoking temporary credentials, and recording a final log entry. In this way, the DARE 12 conserves resources and preserves the ephemeral character of the dynamic agent pool.

To enforce human gating, the governance component 14 issues or validates an approval token that is cryptographically bound to the contemplated state change, such as by hashing the operation plan, target system of record, and agent identity. Binding the token to a specific operation prevents replay against different artifacts or environments. If approval is denied, expires, or fails separation-of-duties checks, the governance component 14 redirects orchestration to a fallback or remediation path as declared in the configuration (e.g., additional analysis by a dynamic agent 16, escalation to a higher approver role, or automatic rollback).

Going back to step 60, if the governance component 14 determines that the agent is an apply agent 26, the agent instantiator 42 creates a persistent agent process at step 70 for the apply agent 26. The governance component 14 at step 72 can apply lifecycle governance policies for the apply agent 26, including versioning, credential rotation, audit logging, and enforcement of human-in-the-loop approvals. The apply agent 26 then, at step 74, performs a state-changing operation that commits results to a persistent storage system 24, such as databases 28, ledgers 30, or code repositories 32 shown in FIG. 1. Unlike dynamic agents 16, the apply agent 26 continues to operate after execution as shown at step 76 and remains subject to ongoing governance by the governance component 14.

FIG. 6 therefore shows how the governance component 14 enforces different governance paths depending on whether the DARE 12 instantiates a dynamic or an apply agent. As described above, including with reference to FIGS. 1 and 5, the DARE 12 manages dynamic agents 16 as ephemeral and collectively governed, while it manages apply agents 26 as persistent and individually governed. This distinction enables the DARE 12 to support scalable experimentation with dynamic agents while ensuring strong controls for apply agents that alter enterprise state.

Figure 7:
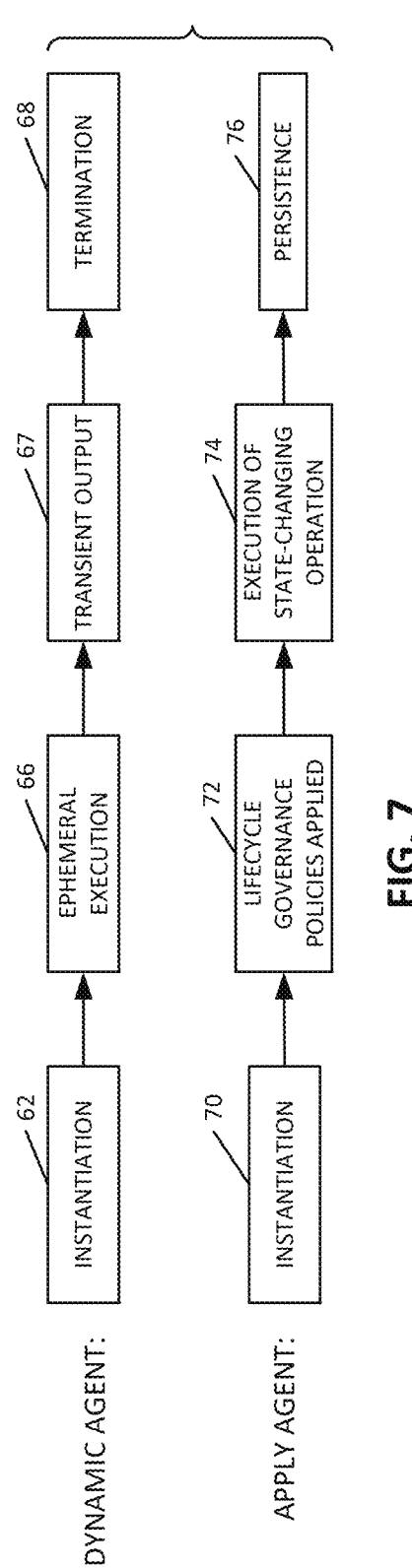
FIG. 7 illustrates representative lifecycle timelines for dynamic agents and apply agents, highlighting differences in persistence and governance, according to various embodiments of the present invention.

FIG. 7 illustrates representative lifecycle timelines for dynamic agents 16 and apply agents 26, further highlighting the distinction introduced in the governance flow of FIG. 6. The two timelines are presented in parallel for comparison, though in practice the lifecycles may unfold concurrently across many agents within the enterprise environment of FIG. 1.

As shown at the top of FIG. 7, the lifecycle of a dynamic agent 16 begins with instantiation at step 62 by the agent instantiator 42 of the DARE 12. The dynamic agent 16 then executes ephemeral operations at step 66, such as parsing configuration files, analyzing program logic, or simulating proposed changes in a sandbox. These operations generate transient outputs at step 67, including reports, logs, or temporary in-memory data structures, but do not commit persistent state changes to enterprise systems of record such as databases 28, ledgers 30, or code repositories 32 of FIG. 1. After such ephemeral execution, the governance component 14 directs the DARE 12 to terminate the agent at step 68, which may involve shutting down the process or container, releasing compute and memory resources, revoking temporary credentials, and recording a final audit log entry. Thus, the dynamic agent 16 exhibits a short-lived lifecycle that ends once its non-state-changing task is complete.

In contrast, as shown at the bottom of FIG. 7, the lifecycle of an apply agent 26 begins with instantiation at step 70, followed by application of lifecycle governance policies at step 72. Such policies may include versioning, credential management, audit logging, and human-in-the-loop approval requirements. At step 74, the apply agent 26 executes a state-changing operation that commits durable modifications to the persistent storage system 24 of FIG. 1, such as writing to a database 28, updating a ledger 30, or merging code into a repository 32. Unlike the dynamic agent 16, the apply agent 26 persists beyond the execution of a single task, as indicated at step 76, and remains subject to ongoing governance by the governance component 14 of the DARE 12.

Accordingly, FIG. 7 shows that dynamic agents 16 have lifecycles characterized by ephemeral execution and termination, whereas apply agents 26 have lifecycles characterized by state-changing operations and persistence. These lifecycle distinctions, introduced in the governance decision flow of FIG. 6, provide the basis for differential governance within the DARE 12, allowing ephemeral agents to be governed collectively at the pool level while persistent agents are governed individually at the agent level.

As will be appreciated with reference to the pipeline illustrated in FIG. 2, the lifecycle distinctions of FIG. 7 apply to different stages of such a workflow. For example, agents performing dependency analysis (e.g., Agents 2 and 3) or architectural simulation (e.g., Agents 4 and 5) may be instantiated as dynamic agents 16 that execute ephemerally and terminate after generating analysis outputs, while agents that commit new source code (e.g., Agents 6 and 7) or persist unit tests (e.g., Agents 8 and 9) may be instantiated as apply agents 26 that persist under lifecycle governance. Thus, the lifecycle timelines of FIG. 7 provide a structural framework for understanding how the DARE 12 (FIGS. 1, 4, and 5) supports pipelines such as FIG. 2 while applying governance policies suited to the different types of agents involved.

Although FIGS. 6 and 7 depict dynamic agents 16 and apply agents 26 as distinct categories, alternative embodiments may implement additional flexibility in the governance model. For example, in some embodiments dynamic agents 16 may persist for the duration of a session or workflow, yet still be classified as non-state-changing so long as they do not commit durable modifications to enterprise systems of record. Conversely, apply agents 26 may be grouped into coordinated ensembles that are governed collectively when executing related state-changing operations, such as a code merge accompanied by a corresponding database update. In still other embodiments, an agent's classification as dynamic or apply may shift over its lifecycle based on policies enforced by the governance component 14. These variations illustrate that the disclosed governance framework is not limited to a binary classification, but instead provides a flexible mechanism for balancing scalability and control across heterogeneous agent workloads.

The distinction between dynamic agents 16 and apply agents 26 can also be understood in terms of a "measure versus cut" paradigm. Dynamic agents 16 act as measure agents, performing analyses, simulations, or validations that can be repeated or discarded with little cost if errors are discovered, i.e., non-state-changing operations for the system. In contrast, apply agents 26 act as cut agents, carrying out operations such as merging code, approving expenses, or releasing builds, where the effects are persistent, business-critical, and costly or disruptive to revoke, i.e., state-changing operations. Because errors by dynamic agents can be cheaply retried without consequence, while errors by apply agents may impose significant business cost, disruption, or compliance risk, the DARE 12 enforces strong lifecycle governance over apply agents. In many embodiments, execution of an apply agent is gated by explicit human approvals or checkpoints enforced by the governance component 14, ensuring that state-changing operations are authorized before they are committed to enterprise systems of record. This asymmetry in revocation cost motivates the differential governance model. As further illustrated by the pipeline of FIG. 2, stages such as dependency analysis or architecture simulation may be implemented using dynamic measure agents that can be repeatedly instantiated and torn down without consequence, while stages such as committing new code or persisting unit tests are implemented using apply cut agents that must be governed individually due to the durable nature of their state changes. Accordingly, governance overhead is compressed for dynamic agents 16 by amortizing lifecycle controls across the agent pool—such as inheriting security patches, rotating short-lived credentials, and enforcing monitoring automatically on instantiation—while governance is enforced explicitly and durably for apply agents 26, which are treated as enterprise assets subject to individual versioning, credential rotation, and audit logging. In this way, the DARE 12 operates analogously to a "governance gearbox," applying an appropriate governance ratio depending on the type of agent instantiated.

Separation of duties can be enforced at approval time by comparing the authenticated identity (or group membership) of the maker agent's initiator with the approver identities. In some embodiments, the governance component 14 consults enterprise identity providers (e.g., LDAP/Active Directory/

OAuth groups) to verify role membership and quorum, and rejects approvals that would violate maker-checker separation or required multi-party authorization.

Figure 8:
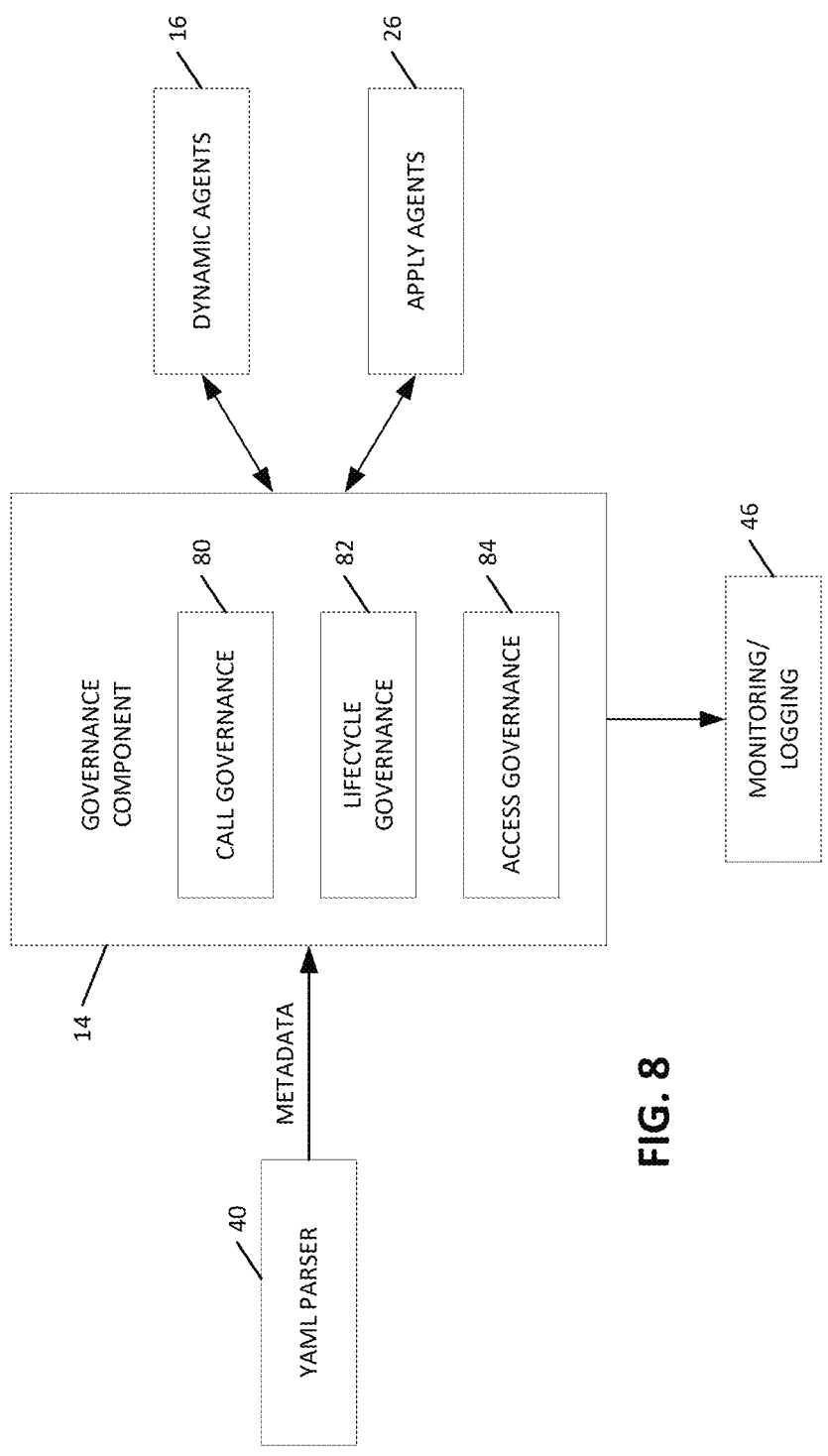
FIG. 8 illustrates governance subcomponents of the DARE, including call governance, lifecycle governance, and access governance, and their application to dynamic and apply agents, according to various embodiments of the present invention.

FIG. 8 illustrates governance subcomponents of the governance component 14 of the DARE 12, and their interactions with other parts of the system. The YAML parser 40 provides metadata to the governance component 14, including indications of agent type, declared actions, and access requirements, as described above in connection with FIG. 5. The governance component 14 applies three types of governance. Call governance 80 regulates invocation-level controls, such as rate limits, retries, and input validation. Lifecycle governance 82 regulates agent creation, update, and persistence, including versioning, credential rotation, patching, and termination criteria. Access governance 84 enforces scope of credentials, segregation of duties, and human-in-the-loop approval requirements. Each of these governance subcomponents applies to dynamic agents 16 and apply agents 26 differently, as shown in FIGS. 6 and 7. Call governance 80 may be applied collectively to a pool of dynamic agents 16, while lifecycle governance 82 is enforced individually on persistent apply agents 26. Access governance 84 spans both types, ensuring that no agent exceeds its declared permissions. As further illustrated by the pipeline of FIG. 2, dependency-analysis or simulation stages carried out by dynamic agents may be governed collectively, while code-commit or test-persistence stages carried out by apply agents are governed individually under stricter lifecycle controls. The bidirectional arrows indicate that governance is not merely applied one way, but also enforces compliance based on signals returned by the agents, including telemetry, approvals, or error states.

The governance component 14 also cooperates with the monitoring/logging component 46 (see FIG. 4) to record events, detect anomalies, and provide observability across both dynamic and apply agents. Monitoring and logging data may in turn trigger governance actions, such as throttling calls, suspending an agent, or requiring additional approvals. Thus, FIG. 8 illustrates how governance is applied as an active, feedback-driven process, integrating declarative metadata from configuration files (FIG. 3), enforcement during agent instantiation and execution (FIGS. 6 and 7), and ongoing oversight through monitoring/logging (FIG. 4).

The monitoring/logging component 46 can also record a tamper-evident audit trail for each human-in-the-loop event, including approver identity and role, decision (approve/deny), rationale text or structured justification where provided, artifacts reviewed, token identifiers, timestamps, and any escalations. Audit records can be retained per enterprise policy and may be exported to external governance, risk, and compliance systems for attestation.

The differential governance framework described herein provides several advantages at the system level. By instantiating dynamic agents 16 ephemerally and governing them collectively, the DARE 12 enables rapid experimentation and scaling of analytical or simulation workloads without consuming excessive enterprise resources. Conversely, by instantiating apply agents 26 persistently and subjecting them to individualized lifecycle and access controls, the DARE 12 ensures compliance, traceability, and auditability for state-changing operations that affect enterprise systems of record. This combination reduces human overhead in pipeline management by allowing governance rules to be declaratively enforced, rather than manually policed, while still supporting human-in-the-loop checkpoints where required. The result is a system that adapts more flexibly to enterprise change, maintains stronger compliance with security and operational policies, and achieves greater efficiency and scalability than prior approaches that treated all agents uniformly.

In addition to orchestrating agent lifecycles and enforcing governance policies, the runtime engine may also enforce non-functional requirements associated with instantiated agents. Such requirements can include, without limitation, performance (e.g., throughput or latency thresholds), scalability (e.g., maximum concurrent instances), security (e.g., encryption, credential usage, or sandboxing), reliability (e.g., failover and recovery policies), availability (e.g., uptime targets), maintainability (e.g., version control and patch management), usability (e.g., accessibility or interface guidelines), and portability (e.g., compliance with containerization or cross-platform deployment standards). In some embodiments, non-functional requirements are declaratively specified within the agent configuration file, allowing the same YAML or other format used to define agent roles, inputs, and outputs to also encode service-level constraints.

In other embodiments, non-functional requirements are applied automatically at runtime by the orchestration manager 44 and governance component 14, based on enterprise policies or firmwide service frameworks. For example, the orchestration manager 44 may allocate compute resources according to declared performance targets, while the governance component 14 enforces security, audit logging, and availability requirements in accordance with enterprise policy. As further illustrated by the multi-agent pipeline of FIG. 2, such non-functional requirements may be applied at different stages of execution, ensuring that dependency-checking agents, architecture agents, coding agents, and testing agents all operate under enforceable performance, security, and compliance constraints appropriate to their role. By unifying functional orchestration with enforcement of non-functional requirements, the disclosed system provides a runtime environment in which both dynamic agents 16 and apply agents 26 operate under explicit, enforceable constraints that ensure predictable behavior across heterogeneous enterprise workloads.

Referring back to FIG. 1, the disclosed system may be implemented using a combination of hardware and software elements. The server 10 that hosts the Dynamic Agent Runtime Engine (DARE) 12 may include one or more physical processors, such as multi-core CPUs, GPUs, or specialized accelerators, coupled with memory subsystems including volatile memory (e.g., DRAM) and non-volatile memory (e.g., flash storage). The DARE 12 may be deployed within a virtualized container, a virtual machine, or directly on a physical server, and may execute as one or more processes scheduled by an operating system such as Linux, Windows Server, or a cloud hypervisor. In some embodiments, the server 10 is deployed on-premises within a datacenter; in other embodiments, it resides in a public or private cloud platform, such as Amazon Web Services, Microsoft Azure, or Google Cloud Platform.

The agent configuration file repository 22 may be implemented using a distributed version control system such as Git, a cloud object store such as Amazon S3, or a managed configuration service. Files stored in the repository 22 may be backed by redundant disks, RAID arrays, or distributed block storage systems to provide durability and fault tolerance. The repository 22 may be accessed via secure protocols such as HTTPS, SSH, or VPN tunnels, and may include audit logging, access control lists, and multi-factor authentication for enterprise-grade security.

The persistent storage system 24 may include heterogeneous systems of record, such as relational databases 28 (e.g., Oracle, PostgreSQL, SQL Server), distributed ledgers 30 (e.g., Hyperledger, Ethereum-based systems), and code repositories 32 (e.g., GitHub Enterprise, GitLab, Bitbucket). These storage systems may be deployed on enterprise-class storage arrays, SANs (storage area networks), or cloud-hosted managed services. The apply agents 26 may access such systems via database drivers (e.g., JDBC/ODBC), blockchain client APIs, or repository webhooks, with persistent identifiers, versioning metadata, and cryptographic signatures ensuring that committed state changes are durable and auditable.

The electronic data network 20 interconnecting these components may include local area networks (LANs) with Ethernet links, wide-area networks (WANs) with MPLS backbones, and cloud-based overlay networks. Communication between the DARE 12, the persistent storage system 24, the repository 22, the IT infrastructure 34, and end-user devices 36 may use standard protocols such as TCP/IP, gRPC, RESTful APIs, or message queues (e.g., Kafka, RabbitMQ). Network traffic may be secured using TLS encryption, VPN tunnels, or zero-trust networking frameworks. In practice, dynamic agents 16 may execute within short-lived containers orchestrated by Kubernetes or similar platforms, while apply agents 26 may be bound to persistent processes that maintain open sessions with enterprise systems. The governance component 14 may use enterprise identity providers (e.g., LDAP, Active Directory, OAuth) to enforce access governance and may integrate with monitoring/logging systems 46 that aggregate telemetry into observability platforms such as Splunk, Datadog, or Prometheus.

The server 10 and other computing elements illustrated in FIG. 1 may each be implemented as one or more physical computing machines comprising at least one processor operatively coupled to a memory subsystem via a system bus. The processor may include a central processing unit (CPU), graphics processing unit (GPU), tensor processing unit (TPU), digital signal processor (DSP), or other specialized hardware accelerator. The memory subsystem may include volatile memory such as dynamic random-access memory (DRAM) and non-volatile memory such as flash memory, magnetic disk drives, or solid-state drives. In some embodiments, the system bus further couples the processor and memory subsystem to peripheral interfaces, including network interface cards (NICs), storage controllers, and input/output ports. Accordingly, the server 10 may include one or more network interfaces (e.g., Ethernet NICs, fiber channel adapters, Wi-Fi radios, or cellular transceivers) that provide physical and data link connectivity, enabling the runtime agent processes instantiated by the DARE 12 to communicate with enterprise systems of record and other components of the enterprise environment.

Program instructions implementing the DARE 12, including the governance component 14, orchestration manager 44, agent instantiator 42, parser 40, and logging component 46, may be stored in a non-transitory machine-readable medium and executed by the processor. The non-transitory machine-readable medium may include magnetic disk, optical disk, flash memory, or any other tangible storage device configured to retain instructions. In certain embodiments, the DARE 12 executes as a set of software modules, services, or containers hosted by a hypervisor or container orchestrator on physical hardware.

The dynamic agents 16 and apply agents 26 may likewise execute as processes or containers instantiated on physical computing hardware. Instantiation may involve allocation of processor cycles, memory segments, and network sockets, and may be mediated by a virtual machine monitor, container runtime, or operating system scheduler. Termination of dynamic agents 16 may include deallocation of such hardware resources, while persistence of apply agents 26 may involve maintaining open sockets, file handles, or durable memory mappings to enterprise storage systems.

In large enterprise deployments, the agents instantiated by the DARE 12 are not isolated processes but instead operate as part of a firmwide agent framework. Such a framework provides shared infrastructure for cross-cutting concerns, including a control plane for coordinating agent scheduling and policy enforcement, an observability layer for telemetry and monitoring, an AI gateway for standardizing model and tool access, and a security layer for enterprise authentication, authorization, and data governance. By integrating with this firmwide framework, dynamic agents 16 and apply agents 26 can be instantiated and governed consistently across business units, while still adhering to enterprise-wide service standards. As illustrated in the inventors' materials (see, e.g., Figure [insert appropriate number, if you decide to add it]), the firmwide agent framework ensures that the disclosed runtime engine is extensible beyond a single application context and can serve as a shared foundation for heterogeneous workloads spanning development, operations, compliance, and business functions.

Communication between components may occur over physical network links, including copper Ethernet, fiber optic connections, or wireless interfaces such as Wi-Fi or cellular radios. Network traffic may be conveyed in frames, packets, or other units of digital transmission, with error detection and correction performed at the hardware and protocol level. In cloud-hosted embodiments, the electronic data network 20 may traverse virtualized networking components implemented by a cloud provider, but ultimately such communication remains grounded in physical networking infrastructure.

In one general aspect, therefore, the present invention is directed to computer systems and computer-implemented methods for instantiating software agents in an enterprise computer system. In various embodiments, the computer system comprise at least one processor and a memory storing executable instructions that, when executed by the at least one processor, implement a dynamic agent runtime engine (DARE), such that the DARE is configured to: retrieve, from a configuration file repository, a configuration file for a software, LLM-based agent, where the configuration file is expressed in a human-readable declarative format; parse the configuration file to extract agent definitions defining parameters for the LLM-based agent, where the parameters comprise a role for the LLM-based agent and at least one of an input or an output for the LLM-based agent; and instantiate, based on the parsed configuration file, a runtime agent process for the LLM-based agent. The computer system also comprises a network interface configured to couple the computer system to enterprise information technology infrastructure to deploy the runtime agent process for the LLM-based agent, where the enterprise information technology infrastructure comprises at least one system of record.

In various implementations, the configuration file is expressed in a YAML format. In various implementations, the agent definitions extracted from the configuration file further comprise an orchestration directive for the LLM-based agent. The orchestration directive may define a workflow that coordinates a plurality of software agents respectively operating at different layers of the enterprise computing system, for example including at least a user-experience layer, a middle-tier application layer, and a database or storage layer, such that outputs of one agent at a first layer are provided as inputs to another agent at a different layer under governance control. In various implementations, the runtime agent process instantiated from the configuration file is subject to governance rules enforced by the DARE, the governance rules comprising at least one of call governance, lifecycle governance, or access governance. In various embodiments, the configuration file designates the LLM-based agent as one of a dynamic agent that performs non-state-changing operations or an apply agent that performs state-changing operations. In various implementations, the at least one system of record comprises at least one of: a code repository that persists source code, a database that persists structured data, a ledger that persists transaction records, an enterprise file store, a configuration management database, or a container registry that retains authoritative state information.

In various implementations, the configuration file further comprises a customizable content field that specifies an enterprise-specific content requirement for the LLM-based agent. As used herein, an "enterprise-specific content requirement" can refer to any declaratively specified rule, standard, or guideline that directs the behavior or outputs of a LLM-based agent in accordance with an enterprise's policies, practices, or conventions. Examples include, without limitation, domain-specific context, business rules, compliance policies, coding standards, and interaction style guidelines.

In various implementations, the agent definitions include a human-in-the-loop directive that requires a specified action from an end-user device before the runtime agent process performs an operation, and wherein the DARE enforces the directive by pausing execution until the specified action is received. The specified action required by a human-in-the-loop directive may take different forms depending on the role of the agent and the enterprise context. For example, the specified action may include an explicit approval to authorize a state-changing operation, such as merging code into a repository or committing financial records to a ledger. In other embodiments, the action may comprise feedback or commentary on an intermediate result generated by a dynamic agent, such as approving, revising, or rejecting an analysis report or proposed architecture. In still further embodiments, the action may involve an override, where a human participant directs the agent to halt or reroute execution based on situational knowledge not available to the system. More generally, the specified action may include any human input that conditions the continuation of an agent's execution, ensuring that sensitive or consequential operations proceed only with user involvement.

In another general aspect, the present invention is directed to computer systems and computer-implemented methods for instantiating and governing multiple types of software agents (e.g., LLM-based agents). In various embodiments, the computer system comprises at least one processor and a memory storing executable instructions that, when executed by the at least one processor, implement a runtime engine configured to: instantiate a first type of software agent in volatile memory to perform one or more non-state-changing operations that generate transient outputs without committing persistent changes to an enterprise system of record; enforce governance over the first type of software agent collectively at a pool level and terminate the first type of software agent upon completion of the one or more non-state-changing operations such that no persistent storage is allocated to the first type of software agent; instantiate a second type of software agent to perform one or more state-changing operations that commit durable changes to at least one enterprise system of record; and enforce governance over the second type of software agent individually at an agent level by maintaining the second type of software agent as a persistent process beyond completion of a single state-changing operation, including applying lifecycle governance controls to the second type of software agent.

In various implementations, the lifecycle governance controls comprise at least one control that enforces versioning of the second type of software agent, credential rotation for the second type of software agent, or audit logging of the second type of software agent. In various implementations, the executable instructions, when executed by the at least one processor, cause the at least one processor to terminate the first type of software agent upon completion of the one or more non-state-changing operations such that no persistent storage is allocated to the first type of software agent by releasing allocated processor and memory resources for the first type of software agent, by revoking of temporary credentials for the first type of software agent, and without committing data from the first type of software agent to persistent storage, including enterprise systems of record. In various implementations, the runtime engine is further configured to: retrieve, from a configuration file repository, a first configuration file expressed in a human-readable declarative format and defining parameters for the first type of software agent; retrieve, from the configuration file repository, a second configuration file expressed in a human-readable declarative format and defining parameters for the second type of software agent; and instantiate the first type of software agent and the second type of software agent based on the respective configuration files.

In various implementations, governance over the first type of software agent is amortized collectively across an agent pool, and governance over the second type of software agent is enforced explicitly for each individual agent. In many embodiments, governance for dynamic agents 16 is applied collectively at the level of the dynamic agent pool rather than individually per agent instance. For example, dynamic agents 16 may inherit common governance policies upon instantiation-such as rate limits, credential scoping, or security patch levels-without requiring separate lifecycle enforcement for each instance. This amortization of governance across the pool reduces overhead while ensuring uniform compliance. In contrast, apply agents 26 can be subject to governance enforced individually for each agent instance, such that versioning, credential rotation, and audit logging are maintained at the level of the specific apply agent 26. This distinction between pooled governance for dynamic agents 16 and individualized governance for apply agents 26 allows the runtime engine to scale ephemeral operations efficiently while preserving strong accountability for state-changing operations.

In various implementations, the first type of software agent is instantiated with short-lived, scoped credentials that are revoked upon termination, and the second type of software agent is instantiated with persistent credentials bound to at least one enterprise system of record. In various implementations, the second type of software agent is instantiated as a persistent process bound to an enterprise system of record and managed under lifecycle governance policies that regulate its persistence and interactions. In various implementations, governance comprises call governance applied collectively to the first type of software agent and lifecycle governance applied individually to the second type of software agent.

While the present invention has been described in connection with exemplary embodiments, it will be understood by those skilled in the art that various changes, substitutions, and modifications may be made without departing from the scope of the invention. The systems and methods described herein may be implemented in a wide variety of computing environments and configurations, and references to particular hardware, software, or architectural components are illustrative rather than limiting. Unless otherwise stated, no particular order of operations is required, and the steps of any described methods may be rearranged, combined, or omitted in accordance with the design objectives. Furthermore, the use of singular terms (e.g., "a," "the," "one") should be understood to encompass both singular and plural instances unless clearly indicated otherwise.

Nothing in the foregoing description is intended to imply that any particular feature, element, or embodiment is essential to the invention or required for every implementation. Where features are described in relation to separate embodiments, such features may be combined in a single embodiment unless explicitly stated otherwise. The scope of the invention is defined solely by the claims and their legal equivalents, and not by any examples provided in the description.

What is claimed is:

1. A computer system for instantiating software agents in an enterprise computer system, the computer system comprising:
   at least one processor;
   a memory storing executable instructions that, when executed by the at least one processor, implement a dynamic agent runtime engine (DARE) configured to:
      retrieve, from a configuration file repository, a configuration file for a software agent, wherein the configuration file is expressed in a human-readable declarative format, wherein the software agent comprises an LLM-based agent that is configured to make one or more decisions, employ one or more tools dynamically, and adapt to input variation;
      parse the configuration file to extract agent definitions defining parameters for the software agent, wherein the parameters comprise a role for the software agent and at least one of an input or an output for the software agent; and
      instantiate, based on the parsed configuration file, a runtime agent process for the software agent; and
   a network interface configured to couple the computer system to enterprise information technology infrastructure to deploy the runtime agent process for the software agent, wherein the enterprise information technology infrastructure comprises at least one system of record and the software agent interacts with the system of record.

2. The computer system of claim 1, wherein the configuration file is expressed in a YAML format.

3. The computer system of claim 1, wherein the agent definitions extracted from the configuration file further comprise an orchestration directive for the software agent.

4. The computer system of claim 1, wherein the runtime agent process instantiated from the configuration file is subject to governance rules enforced by the DARE, the governance rules comprising at least one of call governance, lifecycle governance, or access governance.

5. The computer system of claim 1, wherein the configuration file designates the software agent as one of a dynamic agent that performs non-state-changing operations or an apply agent that performs state-changing operations.

6. The computer system of claim 1, wherein the at least one system of record comprises at least one of: a code repository that persists source code, a database that persists structured data, a ledger that persists transaction records, an enterprise file store, a configuration management database, or a container registry that retains authoritative state information.

7. The computer system of claim 1, wherein the configuration file further comprises a customizable content field that specifies an enterprise-specific content requirement for the software agent.

8. The computer system of claim 1, wherein the agent definitions include a human-in-the-loop directive that requires a specified action from an end-user device before the runtime agent process performs an operation, and wherein the DARE enforces the directive by pausing execution until the specified action is received.

9. A computer system for instantiating and governing multiple types of software agents, the computer system comprising:
   at least one processor; and
   a memory storing executable instructions that, when executed by the at least one processor, implement a runtime engine configured to:
      instantiate a first type of software agent in volatile memory to perform one or more non-state-changing operations that generate transient outputs without committing persistent changes to an enterprise system of record;
      enforce governance over the first type of software agent collectively at a pool level and terminate the first type of software agent upon completion of the one or more non-state-changing operations such that no persistent storage is allocated to the first type of software agent;
      instantiate a second type of software agent to perform one or more state-changing operations that commit durable changes to at least one enterprise system of record; and
      enforce governance over the second type of software agent individually at an agent level by maintaining the second type of software agent as a persistent process beyond completion of a single state-changing operation, including applying lifecycle governance controls to the second type of software agent,
   wherein each of the first and second types of software agents is a LLM-based agent that is configured to make one or more decisions, employ one or more tools dynamically, and adapt to input variation.

10. The computer system of claim 9, wherein the lifecycle governance controls comprise at least one control that enforces versioning of the second type of software agent, credential rotation for the second type of software agent, or audit logging of the second type of software agent.

11. The computer system of claim 9, wherein the executable instructions, when executed by the at least one processor, cause the at least one processor to terminate the first type of software agent upon completion of the one or more non-state-changing operations such that no persistent storage is allocated to the first type of software agent by releasing allocated processor and memory resources for the first type of software agent, by revoking of temporary credentials for the first type of software agent, and without committing data from the first type of software agent to persistent storage, including enterprise systems of record.

12. The computer system of claim 9, wherein the runtime engine is further configured to:
   retrieve, from a configuration file repository, a first configuration file expressed in a human-readable declarative format and defining parameters for the first type of software agent;
   retrieve, from the configuration file repository, a second configuration file expressed in a human-readable declarative format and defining parameters for the second type of software agent; and
   instantiate the first type of software agent and the second type of software agent based on the respective configuration files.

13. The computer system of claim 9, wherein governance over the first type of software agent is amortized collectively across an agent pool, and governance over the second type of software agent is enforced explicitly for each individual agent.

14. The computer system of claim 9, wherein the first type of software agent is instantiated with short-lived, scoped credentials that are revoked upon termination, and the second type of software agent is instantiated with persistent credentials bound to at least one enterprise system of record.

15. The computer system of claim 9, wherein the second type of software agent is instantiated as a persistent process bound to an enterprise system of record and managed under lifecycle governance policies that regulate its persistence and interactions.

16. The computer system of claim 9, wherein governance comprises call governance applied collectively to the first type of software agent and lifecycle governance applied individually to the second type of software agent.

17. A computer-implemented method for instantiating software agents in an enterprise computer system, the method comprising:
   retrieving, by at least one processor from a configuration file repository, a configuration file for a software agent, wherein the configuration file is expressed in a human-readable declarative format, and wherein the software agent comprises an LLM-based agent that is configured to make one or more decisions, employ one or more tools dynamically, and adapt to input variation;
   parsing, by the at least one processor, the configuration file to extract agent definitions defining parameters for the software agent, wherein the parameters comprise a role for the software agent and at least one of an input or an output for the software agent;
   instantiating, by the at least one processor based on the parsed configuration file, a runtime agent process for the software agent; and
   coupling, by a network interface of the enterprise computer system, the runtime agent process to enterprise information technology infrastructure to deploy the runtime agent process for the software agent, wherein the enterprise information technology infrastructure comprises at least one system of record and the software agent interacts with the system of record.

18. The method of claim 17, wherein the configuration file is expressed in a YAML format.

19. The method of claim 17, further comprising extracting, from the configuration file, an orchestration directive for the software agent, wherein the orchestration directive defines a workflow that coordinates a plurality of software agents respectively operating at different layers of the enterprise computing system.

20. The method of claim 17, further comprising subjecting the runtime agent process to governance rules enforced by a dynamic agent runtime engine (DARE), the governance rules comprising at least one of call governance, lifecycle governance, or access governance.

21. The method of claim 17, wherein the configuration file designates the software agent as one of a dynamic agent that performs non-state-changing operations or an apply agent that performs state-changing operations.

22. The method of claim 17, wherein the configuration file further comprises a customizable content field that specifies an enterprise-specific content requirement for the software agent.

23. The method of claim 17, wherein the agent definitions include a human-in-the-loop directive that requires a specified action from an end-user device before the runtime agent process performs an operation, and wherein the method further comprises pausing execution until the specified action is received.

24. A computer-implemented method for instantiating and governing multiple types of software agents in an enterprise computer system, the method comprising:

instantiating, by at least one processor, a first type of software agent in volatile memory to perform one or more non-state-changing operations that generate transient outputs without committing persistent changes to an enterprise system of record;

enforcing, by the at least one processor, governance over the first type of software agent collectively at a pool level and terminating the first type of software agent upon completion of the one or more non-state-changing operations such that no persistent storage is allocated to the first type of software agent;

instantiating, by the at least one processor, a second type of software agent to perform one or more state-changing operations that commit durable changes to at least one enterprise system of record; and enforcing, by the at least one processor, governance over the second type of software agent individually at an agent level by maintaining the second type of software agent as a persistent process beyond completion of a single state-changing operation, including applying lifecycle governance controls to the second type of software agent, wherein each of the first and second types of software agents is a LLM-based agent that is configured to make one or more decisions, employ one or more tools dynamically, and adapt to input variation.

25. The method of claim 24 wherein the lifecycle governance controls comprise at least one control that enforces versioning of the second type of software agent, credential rotation for the second type of software agent, or audit logging of the second type of software agent.

26. The method of claim 24 further comprising terminating the first type of software agent upon completion of the one or more non-state-changing operations such that no persistent storage is allocated to the first type of software agent by releasing allocated processor and memory resources, revoking temporary credentials, and preventing data from being committed to persistent storage, including enterprise systems of record.

27. The method of claim 24 further comprising:

retrieving, from a configuration file repository, a first configuration file expressed in a human-readable declarative format and defining parameters for the first type of software agent;

retrieving, from the configuration file repository, a second configuration file expressed in a human-readable declarative format and defining parameters for the second type of software agent; and instantiating the first type of software agent and the second type of software agent based on the respective configuration files.

28. The method of claim 24 wherein governance over the first type of software agent is amortized collectively across an agent pool, and governance over the second type of software agent is enforced explicitly for each individual agent.

29. The method of claim 24 wherein instantiating the first type of software agent comprises binding short-lived, scoped credentials that are revoked upon termination, and instantiating the second type of software agent comprises binding persistent credentials to at least one enterprise system of record.

30. The method of claim 24 wherein enforcing governance comprises applying call governance collectively to the first type of software agent and lifecycle governance individually to the second type of software agent.

* * * * *